April 24, 1962 J. S. GASSAWAY 3,030,949

BODY MANIPULATING APPARATUS

Filed Aug. 1, 1958 5 Sheets-Sheet 1

INVENTOR.
JAMES S. GASSAWAY
BY
Bernard Kriegel
ATTORNEY.

BODY MANIPULATING APPARATUS

Filed Aug. 1, 1958

INVENTOR.
JAMES S. GASSAWAY
BY
Bernard Kriegel
ATTORNEY.

INVENTOR.
JAMES S. GASSAWAY
BY
Bernard Kriegel
ATTORNEY.

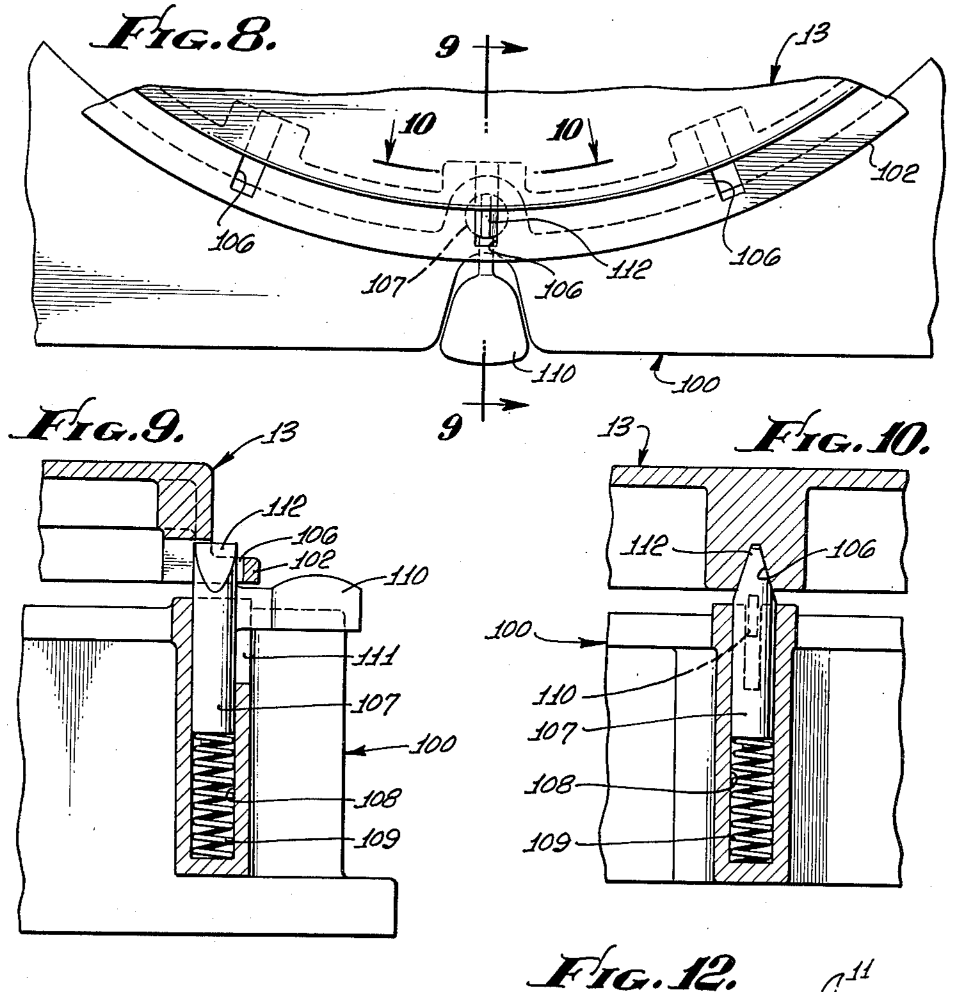
FIG. 8. FIG. 9. FIG. 10.
FIG. 12.
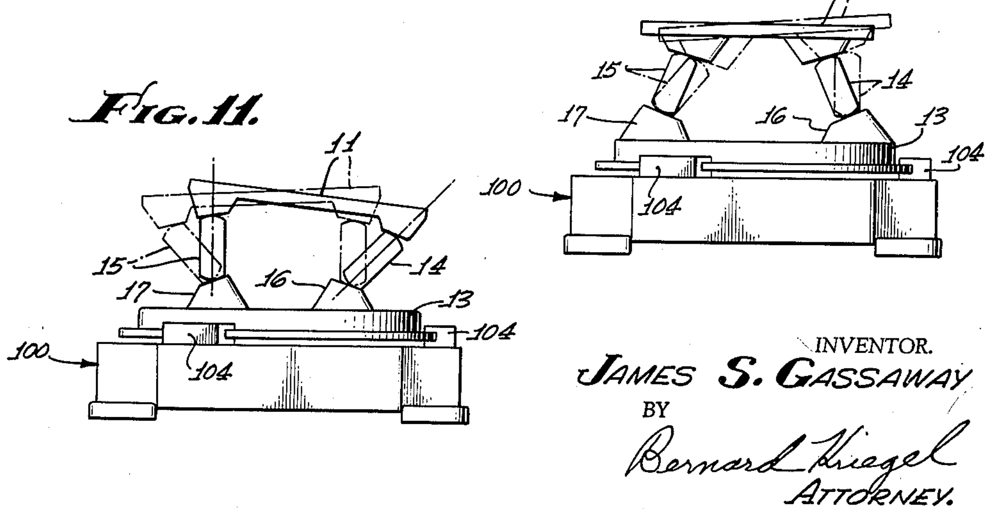
FIG. 11.
INVENTOR.
JAMES S. GASSAWAY
BY
Bernard Kriegel
ATTORNEY.

April 24, 1962 J. S. GASSAWAY 3,030,949

BODY MANIPULATING APPARATUS

Filed Aug. 1, 1958 5 Sheets-Sheet 5

INVENTOR.
JAMES S. GASSAWAY
BY
Bernard Kriegel
ATTORNEY.

United States Patent Office 3,030,949

Patented Apr. 24, 1962

3,030,949
BODY MANIPULATING APPARATUS

James S. Gassaway, 2346 Glendon Ave., Los Angeles, Calif.

Filed Aug. 1, 1958, Ser. No. 752,543
8 Claims. (Cl. 128—33)

The present invention relates to apparatus for manipulating different portions of a person's body and more particularly to table, and like supports, for imparting an exercising or similar action to a person's body for the purpose of effecting relaxation, weight reduction and posture correction, or for other reasons of health.

An object of the invention is to provide body manipulating apparatus having a platform on which the body can rest, which is rockably or rollably mounted on a supporting structure in such manner as to be reciprocable and tiltable during reciprocation.

Another object of the invention is to provide body manipulating apparatus having a reciprocable platform that tilts during reciprocation, in which friction losses in the relatively movable parts are greatly minimized.

A further object of the invention is to provide body manipulating apparatus having a seat or platform reciprocably or oscillatably mounted on a supporting structure in such manner as to require no lubrication of the mounting mechanism.

An additional object of the invention is to provide body manipulating apparatus in which the major portions of the apparatus can be made of castings, requiring no subsequent machining, but, nevertheless, possessing sufficient accuracy for proper operation of the apparatus. Accordingly, substantial economy of manufacture can be effected while producing an apparatus that is exceedingly strong and sturdy.

Yet another object of the invention is to provide body manipulating apparatus having a seat or platform pivotally supported on an underlying structure through the agency of a plurality of links that are under compression, the links being non-parallel one another to produce a tilting action on the seat or platform while it is being reciprocated.

Still a further object of the invention is to provide body manipulating apparatus having an oscillatable or reciprocable platform on which a person's body can rest, in which the apparatus is adjustable to change the direction of oscillation or reciprocation of the platform. Thus, a backward or forward oscillation or reciprocation on the person's body can occur, or a sideways oscillation or reciprocation, or, if desired, an intermediate position of adjustment can be provided so as to provide a corresponding direction of oscillation or reciprocation of the platform. Preferably, the apparatus is adjustable through about 180 degrees.

Another object of the invention is to provide body manipulating apparatus having an oscillatable or reciprocable seat or platform adjacent one or more end tables on which a person can recline, the direction of oscillation or reciprocation of the seat or platform with respect to the one or more end tables being adjustable. More specifically, adjustment can be made without disassembling the one or more end tables from the body manipulating apparatus.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 8 is a fragmentary top plan view of the locking mechanism for securing the movable support in various positions of adjustment on the fixed support or base;

FIG. 9 is a section taken along the line 9—9 on FIG. 8;

FIG. 10 is a section taken along the line 10—10 on FIG. 8;

FIG. 11 is a diagrammatic view of the reciprocating and tilting action of the apparatus;

FIG. 12 is a diagrammatic view, similar to FIG. 11, of another specific embodiment of the invention;

Figure 1:
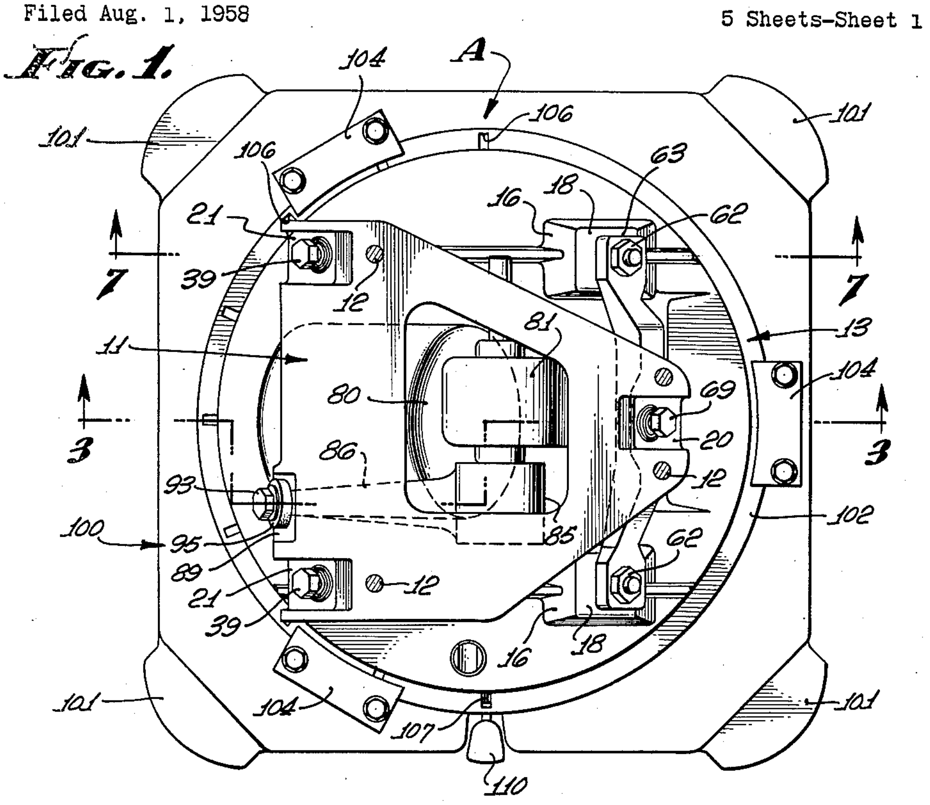
FIGURE 1 is a top plan view of an apparatus, with the seat or platform removed.

As illustrated in the drawings, a body manipulating apparatus A may be disposed between a pair of end tables B, C. The apparatus includes an upper seat or platform 10, generally forming a continuation of the upper parts of the end tables so as to support a portion of a person's body resting upon the end tables. In effect, the platform substantially bridges the gap or space between the end tables.

The seat or platform 10 is mounted for reciprocation and also for tilting. Thus, it is suitably secured to a platform support 11, as by means of screws 12, which is carried by an underlying support 13 through the agency of a plurality, such as a pair, of links 14, 15, the lower ends of which are pivotally or rockably mounted on the support 13 and the upper ends of which are pivotally or rockably associated with the platform support 11. The underlying support may be a casting having longitudinally spaced sets of pads 16, 17 integral therewith. The pads of each set are in alignment, spaced from one another, the upper surfaces 18 of one set of pads 16 lying in a plane inclined to the horizontal, whereas the upper surfaces 19 of the other set of pads 17 are inclined to the horizontal in the opposite direction. Integral with and depending from the platform support 11 are other rocking pads 20, 21. Thus, a pair of aligned pads 21 are disposed above one set 17 of the lower pads and have their surfaces 22 inclined in the same direction as the lower surfaces 19. An intermediate pad 20 at the other end of the support 11 also is disposed above the other lower set of pads 16 on the support 13 and is disposed intermediate of such pads. Its surface 23 is also inclined in the same direction as the lower pad surfaces 18.

A link structure extends between and coacts with the upper and lower sets of pads on the underlying support 13 and on the seat support 11. This link structure is pivotally or rockably connected to the lower pads 16, 17 and also to the upper pads 20, 21. Thus, the lower end of the link 15 has spaced arcuate or cylindrical surfaces 25 adapted to roll or rock upon the upper ends 26 of bearing bushings 27 disposed within the lower support pads 17. Each bushing extends within a bore 28 in a pad, the upper flange 29 of the bushing being received within a counterbore 30 in the pad and bearing against the bottom of the latter to prevent downward axial movement of the bushing within the pad. The bushings may be made of a suitable sound absorbing material, such as nylon, the cylindrical lower surfaces 25 of the link rolling or rocking upon the upper plane surfaces 26 of the bushings. In a similar manner, the upper end of the link 15 has spaced arcuate or cylindrical surfaces 31 rollable or rockable upon the lower ends 32 of bushings 33 mounted within bores 34 in the upper pads 21, there being lower bushing flanges 35 received within lower counterbores 36 in the pads to prevent upward movement of the bushings within the pads. The cylindrical ends of the link 15 are rollable upon the ends of the bushings rather than the plane ends of the pads 17 because of the sound absorbing properties of the bushings and their ease of replacement.

The upper and lower cylindrical surfaces 31, 25 of the link 15 are maintained in rollable contact with the upper and lower bushings 33, 27 by suitable retainers, such as bolts 37 extending through the bushings 27, 33 and fittings snugly within bores 38 in the side portions of the link 15. A universal joint type of mounting is provided for each bolt. As specifically disclosed, the upper head 39 of each bolt may engage a washer 40 bearing against the upper end of a conical compression spring 41, the lower end of which bears against a spring seat 42 on the upper support pad 21. The bolt extends through an upwardly diverging hole 43 in the bushing 33, through the link 15, and through a downwardly diverging hole or bore 44 in the lower bushing 27, a nut 45 being threaded on the lower end of the bolt and engaging a washer 46, which, in turn, bears against the smaller end of a conical compression spring 47 bearing against a spring seat 48 on the lower support pad 17. The springs 41, 47, being under compression, will urge the platform support 11 downwardly, with its upper bushings 33 bearing against the cylindrical surfaces 31 of the link, and with the lower cylindrical surfaces 25 of the link bearing against the upper ends 26 of the lower bushings 27.

The other link 14 is pivotally or rockably connected to the lower support 13 and also to the platform support 11 in a similar manner. This link has spaced turn supports between its lower portion and the lower support 13 and a single, intermediate support with the upper platform supporting member 11. As disclosed, the lower end of the link has spaced arcuate or cylindrical surfaces 50 bearing against the upper ends 51 of bushings 52 fitting within the spaced pads 16. The upper intermediate portion of the link also has a cylindrical or arcuate surface 53 bearing against the lower end 54 of a bushing 55 fitting within the central pad 20 of the platform support 11. The lower bushings 52 have flanges 56 seated within counterbores 57 in the lower support pads, the upper bushing 55 also having a flange 58 fitting within a counterbore 59 in the upper pad. Bolts 60 extend snugly through the end cylindrically surfaced portions 61 of the link 14 and through the bushings 52. The upper heads 62 of these bolts engage the upper end surfaces 63 of the link, whereas, the lower portions have nuts 64 threaded thereon and bearing against washers 65 engaging the lower ends of conical compression springs 66 that seat against the lower pads 16. The spring and bolt arrangement retains the link with its cylindrical surfaces 50 in bearing engagement against the plane ends of the bushings 52, maintaining such bearing engagement during rocking of the cylindrical surfaces on the ends of the bushings. To permit such rocking to occur, the bores 67 through the bushings diverge in a downward direction, so that the bolt has freedom of rocking movement therein.

In a similar manner, the upper platform bushing 55 is maintained in rocking or rollable contact with the upper cylindrical surface 53 by a bolt 68 extending through an upwardly divergent bore 55*a* of the bushing and snugly through the cylindrical intermediate portion of the link 14. The upper head 69 of the bolt bears against a washer 70 that engages a conical compression spring 71 seating against the platform pad 20. The lower end of the bolt has a nut 72 threaded thereon bearing against the underside of the link 14. Thus, the bolt and spring device retains the cylindrical surface 53 in rockable or rollable contact with the plane surface of the bushing 55.

The upper ends of the lower bushings 27 for the link 15 are coplanar, the plane being parallel to the axis about which the lower cylindrical surfaces 25 are developed. These cylindrical surfaces have the same radius of curvature, the centers of curvature lying on the same common axis parallel to the contacting ends of the bushings 27. Similarly, the lower ends of the upper bushings 33 lie in a common plane parallel to a common axis about which the upper cylindrical surfaces 31 are generated. The upper cylindrical surfaces have the same radius of curvature, the center of which lies on a common axis parallel to the surfaces of the upper bushings. In fact, the lower cylindrical surfaces 25 and the upper cylindrical surfaces 31 lie on a common cylinder, the axis of which is parallel to the plane ends of the lower bushings and upper bushings. The link 15, in effect, is actually a portion of a roller having its periphery 25, 31 engaging the lower bushings 27 and the upper bushings 33 so that the cylindrical surface of the link 15, in effect, rolls along the ends of the upper and lower bushings.

The other link 14 is similarly developed. The upper and lower cylindrical surfaces 53, 50 actually lie on the periphery of the same cylinder having an axis parallel to the planes of the upper and lower bushings 55, 52, such that the link 14, in effect, rolls on the ends of the lower bushings and the upper bushing during oscillation or rocking of the link.

The platform support 11 and the platform or seat 10 secured thereto are reciprocated by an eccentric mechanism. As specifically shown, an electric motor 80 drives a gear reducer 81 having a driven shaft 82 extending therefrom to which an eccentric 83 is suitably attached. The casing of the gear reducer 81 is suitably secured to the support 13, as by means of screws 84. The large end 85 of a connecting rod 86 encompasses the eccentric 83, the other end of the rod being attached to an end of the platform support 11 through a pivotal connection. As disclosed, such connection includes a rubber or rubber-like bushing 87 extending through a bore 88 in an inclined, depending pad 89 of the platform support. A rubber or rubber-like washer 90 bears against the inner surface of the pad 89, the other side of the rubber washer engaging a metallic washer 91 bearing against the outer end of the connecting rod 86. A screw 92 extends through the bushing 87 and washers 90, 91, being threadedly secured to the outer end of the connecting rod 86. The outer head 93 of the screw engages a metallic washer 94 which, in turn, engages a rubber washer 95 bearing against the outer surface of the pad 89. In effect, the screw 92 may be considered as constituting an extension of the connecting rod 86.

As the motor 80 rotates to rotate the eccentric 83 at the proper speed through the gear reducer 81, the connecting rod 86 is reciprocated to reciprocate the platform support 11 and the seat or platform 10 secured thereto. The rubber or rubber-like bushing 87 and washers 90, 95 will flex or yield sufficiently to permit the slight pivotal action that occurs between the outer end of the connecting rod 86 and the platform pad 89. During such reciprocation, the platform support 11 is also reciprocated, the links 14, 15 rocking on the underlying support 13, and the platform support 11 rocking upon the upper cylindrical surfaces 31, 53 of the links.

Figure 2:
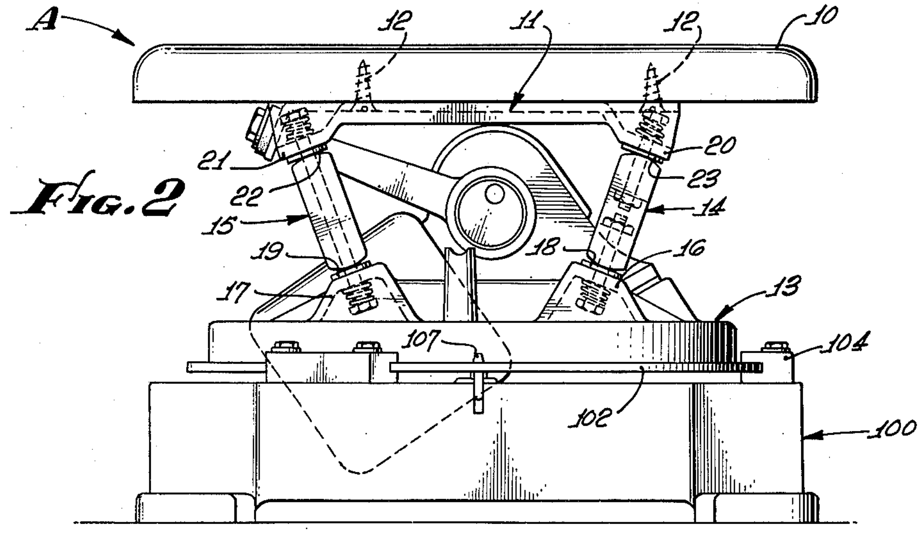
FIG. 2 is a side elevational view of the apparatus disclosed in FIG. 1.
Figure 3:
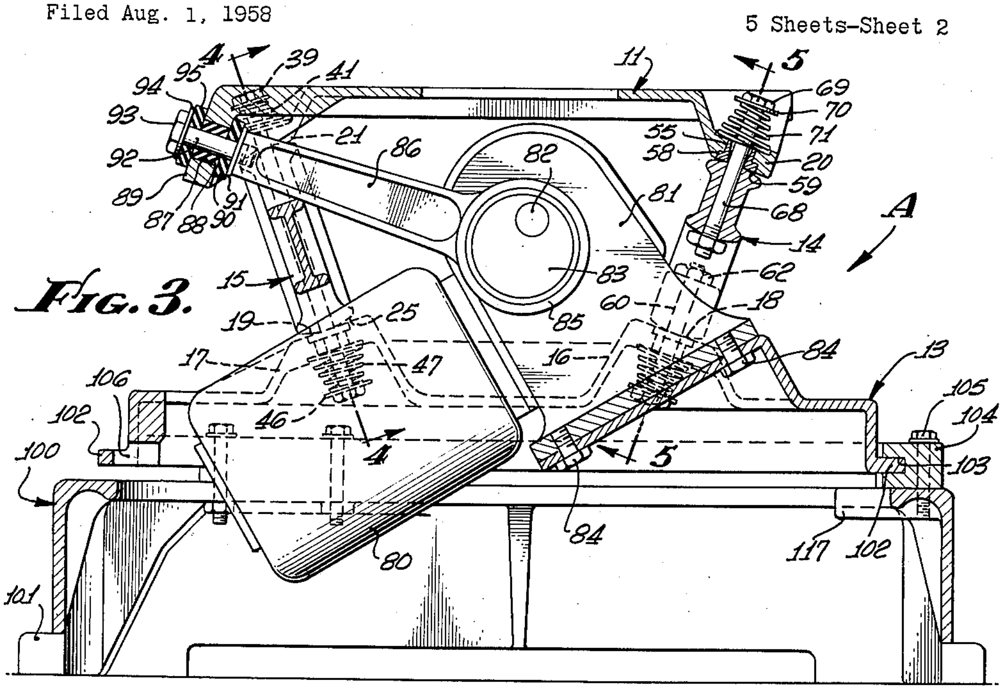
FIG. 3 is a vertical section, on an enlarged scale, taken along the line 3—3 on FIG. 1.
Figure 4:
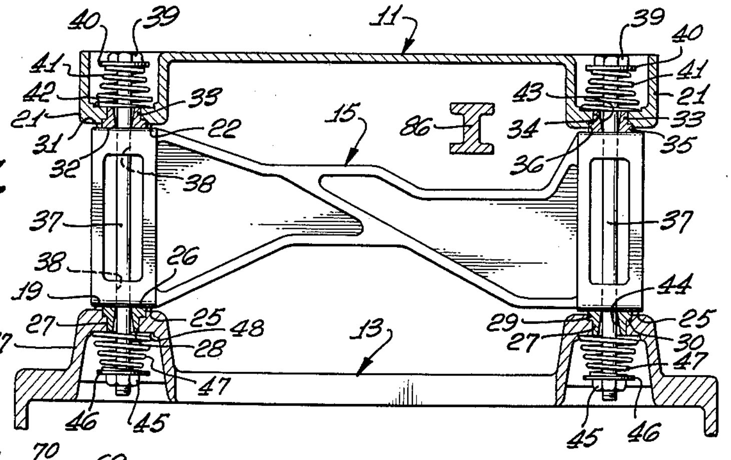
FIG. 4 is an enlarged section taken along the line 4—4 on FIG. 3.
Figure 5:
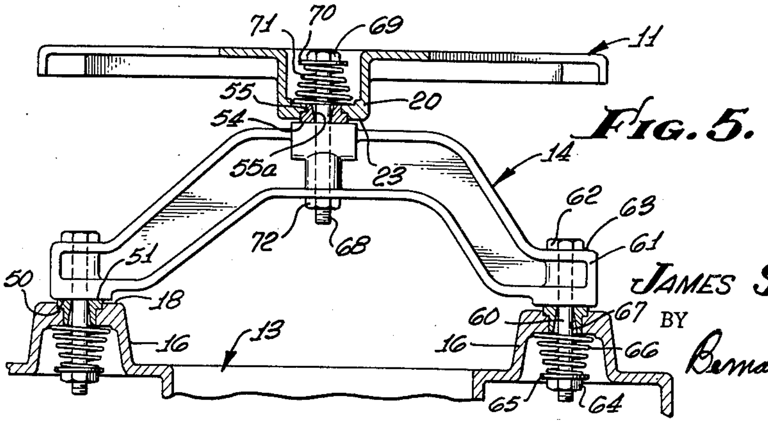
FIG. 5 is an enlarged section taken along the line 5—5 on FIG. 3.
Figure 6:
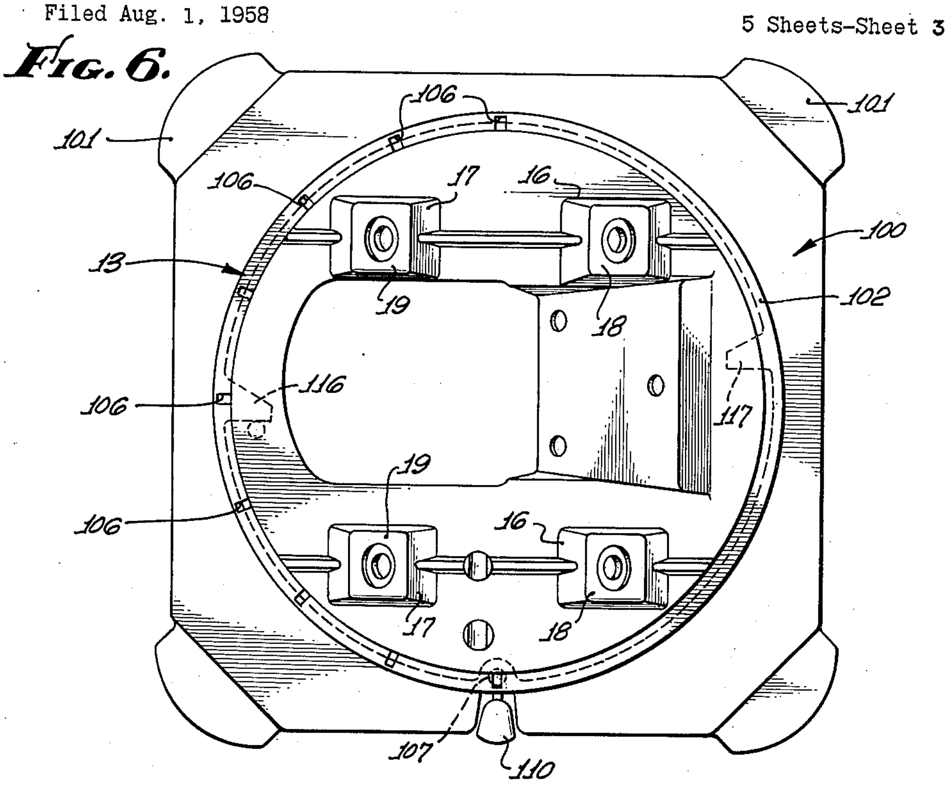
FIG. 6 is a top plan view of the main support or base of the apparatus, with the turntable or movable support mounted thereon.
Figure 7:
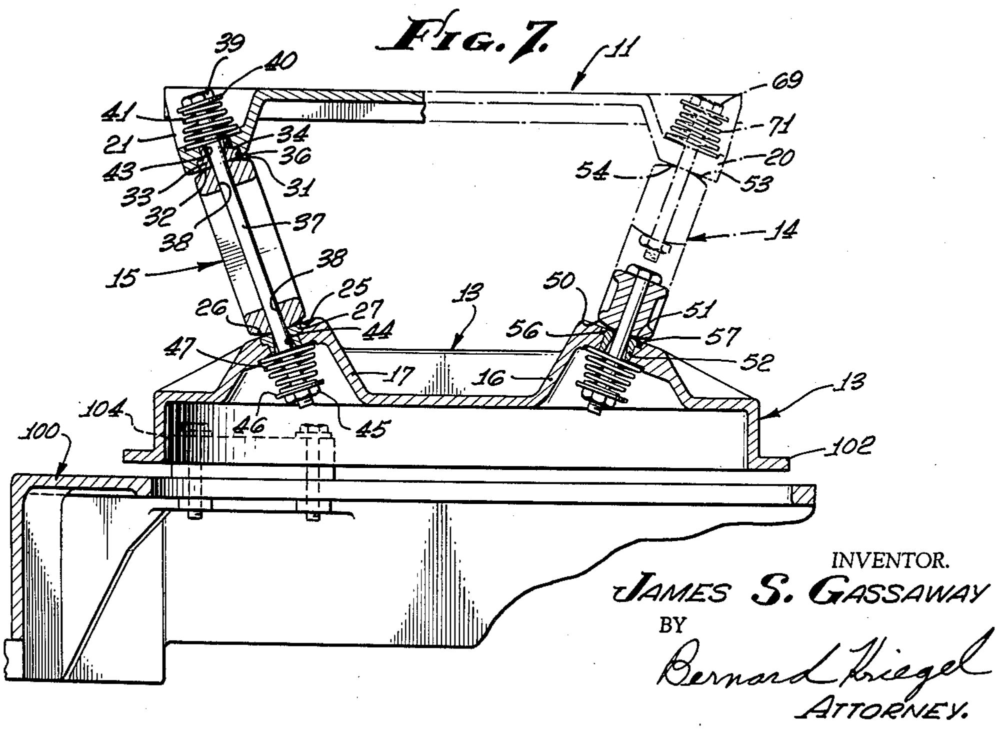
FIG. 7 is an enlarged section taken along the line 7—7 on FIG. 1.
Figure 13:
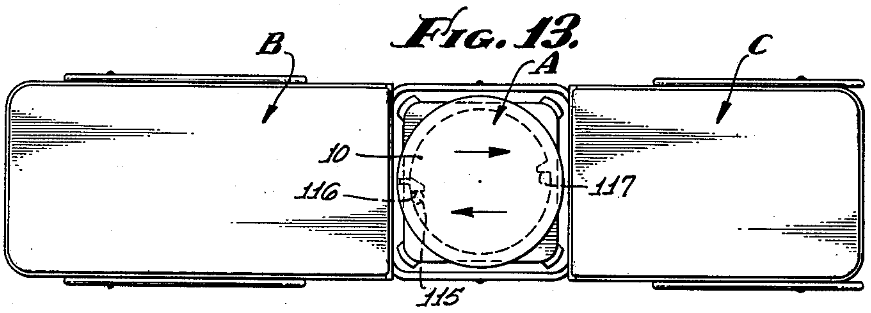
FIG. 13 is a top plan view of the apparatus in combination with tables on opposite ends thereof.
Figure 14:
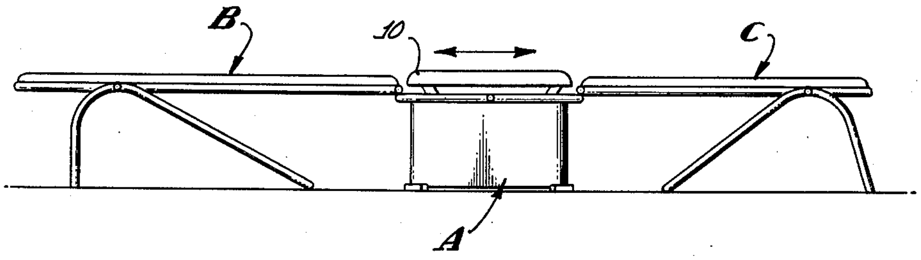
FIG. 14 is a side elevation of the apparatus disclosed in FIG. 13.
Figure 15:
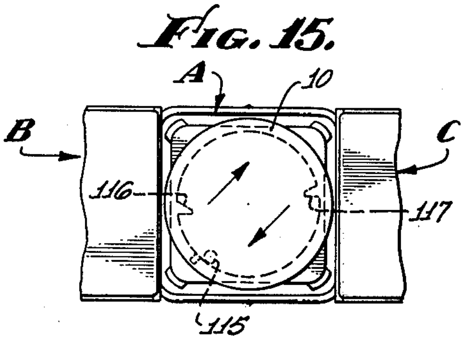
FIGS. 15, 16 and 17 are top plan views of the central portion of the apparatus shown in FIG. 13 with the reciprocating platform adjusted for movement in different specific directions.
Figure 16:
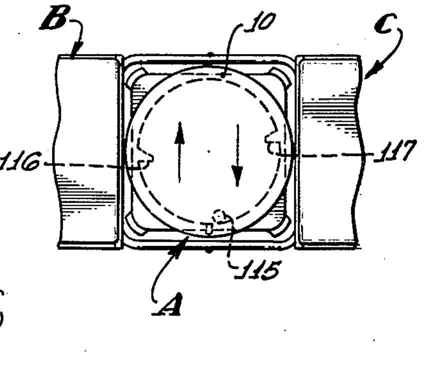
Figure 17:
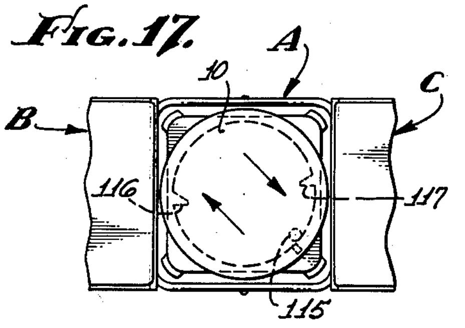

It will be noted that the links 14, 15 are disposed at an angle to each other, such as at a downwardly converging angle, the upper ends of the links being spaced further apart than their lower ends. As disclosed in FIGS. 2, 3 and 7, the eccentric 83 is in a substantially central position, such that one link 15 is inclined in an upward direction towards the left and the other link 14 is inclined in an upward direction towards the right. Assuming clockwise rotation of the eccentric, such rotation will at first shift the connecting rod 86 and the platform support 11 pivotally connected thereto to the left, as seen in the drawings. In view of the directions of inclination of the links, the upper end of the left-hand link 15 will lower, whereas the upper end of the right link 14 will raise, correspondingly lowering the left end of the platform 10 and raising its right end, the platform assuming a downwardly tilting position to the left as seen in the drawings (see left position in FIG. 11). Such tilting will occur to the maximum extent when the connecting rod 86 reaches the end of its travel to the left. Continued rotation of the eccentric will then shift the connecting rod 86 to the right. During such movement the links 14, 15 will rock on their respective pads, with the left link 15 moving to the right towards a vertical position and the right link 14 moving to the right away from a vertical position. Thus, the upper end of the left link 15 will reach a higher position and the upper end of the right link will reach a lower position, the platform support being shifted from the tilted position previously described, through the horizontal position illustrated in the drawings, and then to a tilted position in which the right end of the platform 10 is lower than the left end of the platform (see right hand position in FIG. 11). As the eccentric 83 rotates, the platform support 11 and the seat or platform 10 secured thereto will be reciprocated, and during such reciprocation the angular relationship between the links 14, 15 will cause the platform 10 to tilt first in one direction and then in the opposite direction, as described above. During such reciprocation of the platform support 11, the lower cylindrical or arcuate surfaces 25, 50 of the links rock or roll on the lower bushings, whereas the upper cylindrical or arcuate ends 31, 53 of the links rock or roll relatively along the ends of the upper bushings.

In lieu of the links being angularly related to each other such as disclosed in FIGS. 2, 3, 7 and 11, they can be angularly related such that they converge toward each other in an upward direction, as shown diagrammatically in FIG. 12. Reciprocation of the platform support 11 by the eccentric and connecting rod mechanism will result not only in its reciprocation but also in its tilting in different directions generally in the same manner as described above in connection with the upwardly divergent link arrangement. As shown diagrammatically in FIG. 12, movement of the platform support 11 to the right will result in elevation of the right end of the platform and lowering of the left end of the platform support. Shifting of the platform support to the left from the position just described will result in its returning to the horizontal position shown in FIG. 12, and then in elevation of the left end of the support and lowering of its right end, such that it is tilted in the opposite direction. Such reciprocation and tilting of the platform support continues alternately during its back and forth movement.

The provision of the rockable bearing support gives the apparatus a very large load carrying capacity, the links being in compression due to the fact that the load is being transmitted from the platform support 11 downwardly through the links 14, 15 to the underlying support 13. A very large bearing contact is provided between the upper and lower ends of the links and the coengaging ends of the bushings which are mounted in the respective pads. In view of such rocking type of support, it is found that manufacturing errors do not adversely affect proper and smooth functioning of the apparatus. As a result, most of the parts can be made as castings with sufficient accuracy, requiring no subsequent machining, which decreases the cost of manufacturing the apparatus considerably, while at the same time producing an exceedingly strong and sturdy apparatus. The large surfaces of contact between the moving parts and the fact that the coengaging surfaces roll upon one another, minimizes friction losses and also makes it unnecessary for the parts to be lubricated.

The direction of reciprocation of the platform support 11 and the seat 10 with respect to the end tables B, C can be changed very readily. The underlying support 13 is swivelly carried by a stationary base 100 having feet or pads 101 engageable with the floor or other supporting surface. The underlying movable support 13 has a circular flange or rim 102 slidably received within inner grooves 103 in circumferentially spaced turntable guide segments 104 suitably secured to the base 100, as by means of screws 105. The turntable support 13 and the mechanism carried thereby are movable about a vertical axis, the rim or flange 102 sliding in the guide grooves 103. In view of such pivotal arrangement, the direction of reciprocation of the platform support 11 can be readily changed, and such change can occur without disassembling the end tables B, C with respect to the body manipulating apparatus A.

Lock means are provided for retaining the movable support 13 and the mechanism carried thereby in the angular position to which they have been adjusted with respect to the lower base 100 and tables B, C. As specifically shown, the rim or flange portion 102 of the movable support has a plurality of notches 106 therein which may be placed at suitable arcuate distances from one another, and which may extend around the rim to the desired arcuate extent. As an example, such notches 106 may be provided at intervals along 180 degrees of the rim. A locking pin 107 is vertically shiftable in a socket 108 in the base 100, this pin being urged upwardly by a compression spring 109 within the socket bearing against the lower end thereof with its upper end bearing against the pin to shift the latter upwardly into one of the rim notches 106 when aligned therewith. Projecting outwardly from the locking pin 107 and integral therewith is a projection or finger 110 slidable in a vertical guide slot 111 in the base 100 adjacent to the socket 108. Depression of this finger 110 will depress the locking pin 107 and remove its upper tapered end 112 from the rim recess 106, allowing the movable support 13 to be turned with respect to the lower support 100 and the end tables B, C to change the direction of reciprocation of the platform support 11 and the platform seat 10 secured thereto. When shifted to the desired angle, the force on the finger 110 is released and the spring 109 will elevate the locking pin 107 back into engagement with the selected notch 106 to retain the movable support and the mechanism carried thereby in the new position.

The notches 106 are so located in the rim 102 that the mechanism is adjustable to a position in which the platform support is reciprocable in a direction parallel or aligned with the end tables B, C, to various intermediate positions, in which the direction of reciprocation is inclined to the tables, and to a position in which the platform support 11 is reciprocable in a direction at right angles to the end tables. By providing notches 180 degrees apart and the desired number of notches intermediate thereto, the platform support 11 can be shifted so that its direction of reciprocation is fully reversed.

To prevent continuous turning of the movable support 13 relative to the main or fixed support 100, which might twist or damage the electric cord or line running to the electric motor 80, a suitable stop is provided. As shown, a stop lug 115 depending from the movable support 13 is engageable with a stop shoulder 116 on the main support 100 when the movable platform 10 is in alignment with the end tables B C, and this same stop lug will engage another shoulder 117 on the main support or base 100 when the movable support 13 has been shifted about 180 degrees. Thus, the movable support is limited in its movement to an arc of 180 degrees, preventing continuous turning of the turntable support 13 and the mechanism mounted thereon.

The inventor claims:

1. In body manipulating apparatus: a supporting structure; a support for at least a portion of a person's body; means mounting said support on said structure for bodily reciprocation, comprising a plurality of links, the upper and lower ends of said links being curved, one curved end of each link rockably engaging said structure, said support rockably engaging the other curved end of said link; means for reciprocating said support; the upper and lower curved ends of each link lying on a common cylindrical surface; retainer members operatively engaging said links; and spring means engaging said retainer members and said structure and support for maintaining said links in engagement with said structure and support.

2. In body manipulating apparatus: a supporting structure; a support for at least a portion of a person's body; means mounting said support on said structure for bodily reciprocation and for tilting during such reciprocation, comprising a plurality of links, the upper and lower ends of said links being curved, one end of said links rockably engaging said structure, said support rockably engaging the other end of said links, the upper and lower curved ends of each link lying on a common cylindrical surface; said links being non-parallel with respect to each other; means for reciprocating said support; retainer members operatively engaging said links; and spring means engaging said retainer members and said structure and support for maintaining said links in engagement with said structure and support.

3. In body manipulating apparatus: a supporting structure; a support for at least a portion of a person's body; means mounting said support on said structure for bodily reciprocation and for tilting during said reciprocation, comprising a plurality of links, the upper and lower ends of said links being curved, the lower curved ends of said links being rockably mounted on said structure, said support being rockably mounted on the upper curved ends of said links, the upper and lower curved ends of each link lying on a common cylindrical surface; said links being non-parallel with respect to each other; means for reciprocating said support; retainer members operatively engaging said links; and spring means engaging said retainer member and said structure and support for maintaining said links with their curved ends in engagement with said structure and support.

4. In body manipulating apparatus: a supporting structure; a support for at least a portion of a person's body carried by said supporting structure; means for reciprocating said support; a relatively stationary structure; means mounting said supporting structure for turning on said stationary structure to change the direction of reciprocation of said support, comprising a circular rim on said supporting structure; means on said stationary structure providing a guide groove receiving said rim; said rim having arcuately spaced recesses therein; and a locking pin on said stationary structure adapted to be positioned selectively in said recesses to retain said supporting structure in various angular positions on said stationary structure.

5. In body manipulating apparatus: a supporting structure; a support for at least a portion of a person's body carried by said supporting structure; means for reciprocating said support; a relatively stationary structure; means mounting said supporting structure for turning on said stationary structure to change the direction of reciprocation of said support, comprising a circular rim on said supporting structure; means on said stationary structure providing a guide groove receiving said rim; said rim having arcuately spaced recesses therein; a locking pin on said stationary structure adapted to be posiitoned selectively in said recesses to retain said supporting structure in various angular positions on said stationary structure; and coengageable stop means on said supporting and stationary structures for limiting the extent of turning of said supporting structure on said stationary structure.

6. In body manipulating apparatus: a supporting structure; a support for at least a portion of a person's body; means mounting said support on said structure for predominantly horizontal bodily reciprocation, comprising a plurality of links rockably mounted on said structure and translatable along said structure during rocking thereon, said support being rockably mounted on said links and translatable along said links during rocking thereon; said links being non-parallel with respect to each other; and means connected to said support for reciprocating said support predominantly in a horizontal direction through a predetermined amplitude.

7. In body manipulating apparatus: a supporting structure; a support for at least a portion of a person's body; means mounting said support on said structure for bodily reciprocation, comprising a plurality of links, the upper and lower ends of said links being curved, the lower curved ends of said links being rockably mounted on said structure, said support being rockably mounted on the upper curved ends of said links, the upper and lower curved ends of each link lying on a common cylindrical surface; said links being non-parallel with respect to each other; means retaining the curved ends of said links in engagement with said supporting structure and support; and means connected to said support for reciprocating said support through a predetermined amplitude.

8. In body manipulating apparatus: a supporting structure; a support for at least a portion of a person's body; means mounting said support on said structure for predominantly horizontal bodily reciprocation, comprising a plurality of links rockably mounted on said structure and translatable along said structure during rocking thereon, said support being rockably mounted on said links and translatable along said links during rocking thereon; means connected to said support for reciprocating said support through a predetermined amplitude; said links being non-parallel with respect to each other; retaining members operatively engaging said links; and spring means engaging said retainer members and said structure and support for maintaining said links in engagement with said structure and support.

References Cited in the file of this patent

UNITED STATES PATENTS

| | | |
|---|---|---|
| 2,589,570 | Phillips | Mar. 18, 1952 |
| 2,850,184 | Musschoot | Sept. 2, 1958 |
| 2,860,628 | Stauffer | Nov. 18, 1958 |
| 2,878,805 | Sunich | Mar. 24, 1959 |
| 2,882,051 | Lee | Apr. 14, 1959 |

FOREIGN PATENTS

| | | |
|---|---|---|
| 15,329 | Great Britain | 1910 |